US012064939B2

(12) United States Patent
Ouyang et al.

(10) Patent No.: US 12,064,939 B2
(45) Date of Patent: Aug. 20, 2024

(54) FLEXIBLE DISPLAY COVER, FLEXIBLE DISPLAY MODULE, AND FLEXIBLE DISPLAY APPARATUS

(71) Applicant: HUAWEI TECHNOLOGIES CO., LTD., Guangdong (CN)

(72) Inventors: Chenxin Ouyang, Dongguan (CN); Zhongzhi Tang, Shenzhen (CN); Wangchun Lyu, Dongguan (CN); Jing Zhao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 41 days.

(21) Appl. No.: 17/567,576

(22) Filed: Jan. 3, 2022

(65) Prior Publication Data

US 2022/0118744 A1   Apr. 21, 2022

Related U.S. Application Data

(63) Continuation of application No. PCT/CN2020/080073, filed on Mar. 18, 2020.

(30) Foreign Application Priority Data

Jul. 3, 2019 (CN) .......................... 201910601375.6

(51) Int. Cl.
  *B32B 7/12* (2006.01)
  *B32B 17/10* (2006.01)
  (Continued)

(52) U.S. Cl.
  CPC ................ *B32B 17/10* (2013.01); *B32B 7/12* (2013.01); *B32B 27/08* (2013.01); *B32B 27/281* (2013.01);
  (Continued)

(58) Field of Classification Search
  CPC . B32B 17/10; B32B 2255/20; B32B 2255/26; B32B 2270/00; B32B 2307/412; B32B 2307/536; B32B 2307/546; B32B 2307/558; B32B 2307/584; B32B 2307/732; B32B 2457/20; B32B 2571/00; B32B 27/08; B32B 27/281; B32B 27/283;
  (Continued)

(56) References Cited

U.S. PATENT DOCUMENTS

2017/0253706 A1*   9/2017   Lim ........................ C08J 7/042

FOREIGN PATENT DOCUMENTS

CN   102478727 A   5/2012
CN   104347000 A   2/2015
(Continued)

OTHER PUBLICATIONS

Office Action issued in Chinese Application No. 201910601375.6 on May 26, 2021, 18 pages (with English translation).
(Continued)

*Primary Examiner* — Lawrence D Ferguson
(74) *Attorney, Agent, or Firm* — Fish & Richardson P.C.

(57) ABSTRACT

The present disclosure provides example flexible display cover, module, and apparatus. One example cover covers a flexible display. The flexible display cover includes a glass layer and a hardened layer that are superposed. The hardened layer is located on a side of the glass layer away from the flexible display.

17 Claims, 7 Drawing Sheets

(51) Int. Cl.
    *B32B 27/08*     (2006.01)
    *B32B 27/28*     (2006.01)
    *B32B 27/30*     (2006.01)
    *B32B 27/32*     (2006.01)
    *B32B 27/36*     (2006.01)

(52) U.S. Cl.
    CPC .......... *B32B 27/283* (2013.01); *B32B 27/308* (2013.01); *B32B 27/325* (2013.01); *B32B 27/36* (2013.01); *B32B 27/365* (2013.01); *B32B 2255/20* (2013.01); *B32B 2255/26* (2013.01); *B32B 2270/00* (2013.01); *B32B 2307/412* (2013.01); *B32B 2307/536* (2013.01); *B32B 2307/558* (2013.01); *B32B 2307/732* (2013.01); *B32B 2457/20* (2013.01)

(58) Field of Classification Search
    CPC ..... B32B 27/302; B32B 27/308; B32B 27/32; B32B 27/325; B32B 27/36; B32B 27/365; B32B 7/12; G09F 9/301
    See application file for complete search history.

(56) References Cited

FOREIGN PATENT DOCUMENTS

| | | |
|---|---|---|
| CN | 105451988 A | 3/2016 |
| CN | 106406443 A | 2/2017 |
| CN | 108012010 A | 5/2018 |
| CN | 108099282 A | 6/2018 |
| CN | 207818084 U | 9/2018 |
| CN | 108665811 A | 10/2018 |
| CN | 108933156 A | 12/2018 |
| CN | 108962028 A | 12/2018 |
| CN | 109326220 A | 2/2019 |
| CN | 109377886 A | 2/2019 |
| CN | 109377889 A | 2/2019 |
| CN | 109940948 A | 6/2019 |
| CN | 110767842 A | 2/2020 |
| JP | 2000319040 A | 11/2000 |
| JP | 2004054248 A * | 2/2004 |
| JP | 2008083423 A | 4/2008 |
| JP | 2011018508 A | 1/2011 |
| JP | 2015101517 A | 6/2015 |
| JP | 2015202429 A | 11/2015 |
| JP | 2016070972 A | 5/2016 |
| JP | 2016084249 A | 5/2016 |
| JP | 2016122097 A | 7/2016 |
| WO | 2017195752 A1 | 11/2017 |
| WO | 2019066078 A1 | 4/2019 |

OTHER PUBLICATIONS

Office Action issued in Chinese Application No. 201910601375.6 on Mar. 3, 2022, 15 pages (with English translation).
PCT International Search Report and Written Opinion issued in International Application No. PCT/CN2020/080073 on Jun. 8, 2020, 22 pages (with English translation).
Office Action issued in Chinese Application No. 201910601375.6 on May 30, 2022, 17 pages (with English translation).
Office Action in Japanese Appln. No. 2021-578023, dated Mar. 7, 2023, 11 pages (with English translation).

* cited by examiner

FLEXIBLE DISPLAY COVER, FLEXIBLE DISPLAY MODULE, AND FLEXIBLE DISPLAY APPARATUS

CROSS-REFERENCE TO RELATED APPLICATIONS

This application is a continuation of International Application No. PCT/CN2020/080073, filed on Mar. 18, 2020, which claims priority to Chinese Patent Application No. 201910601375.6, filed on Jul. 3, 2019. The disclosures of the aforementioned applications are hereby incorporated by reference in their entireties.

TECHNICAL FIELD

This application relates to the field of terminal technologies, and in particular, to a flexible display cover, a flexible display module, and a flexible display apparatus.

BACKGROUND

Larger screens and better display effects have always been a goal for portable intelligent electronic products. In the past decade, smartphone manufacturers have increased a screen-to-body ratio by eliminating a physical keyboard, replacing a home button with on-screen fingerprint recognition, and compacting a front-facing camera. Currently, screen-to-body ratios of some full-screen smartphones exceed 92%. There is very limited room for increasing the screen-to-body ratio by reducing a width of a middle frame. In 2018, some manufacturers launched prototypes of foldable mobile phones with a flexible OLED screen, breaking through an original idea of a bar-type mobile phone design. The prototype becomes a new mobile phone development trend. After being folded, the foldable mobile phone has only a size of a conventional mobile phone (5 inches to 6 inches), and may be carried around conveniently. In addition, after being unfolded, the foldable mobile phone may have a display size of a tablet computer (7 inches to 8 inches). The foldable mobile phone attracts extensive attention once released. All mobile phone manufacturers are also working hard to optimize and perfect a design solution, and to promote mass production of the foldable mobile phone. In addition to the foldable mobile phone, the flexible OLED screen also has great application prospects in other flexible electronic devices such as a flexible wearable device and a foldable computer.

A glass cover with a millimeter-level thickness of the bar-type mobile phone cannot be bent together with the flexible OLED screen, and therefore cannot be directly used as a display cover of a screen of the foldable mobile phone. Currently, in a design solution of the flexible display cover, a transparent polymer film, for example, a polyethylene terephthalate (PET) or polyimide (PI) plastic film, is mainly used as a cover to protect a display of a display module. Both PET and PI have very good flexibility, and a bending limit thereof may reach R1. However, the transparent polymer film material does not have some outstanding properties of a conventional glass cover. First, surface hardness of the polymer film is much lower than that of glass, and a scratch resistance capability and a wear resistance capability of the cover can be improved only by coating an outer layer with a hard coat. Second, a polymer cover has a low modulus, and cannot provide strong protection for the display module. In addition, due to a viscoelasticity nature of a polymer material, after being statically bent for a long period of time or being dynamically bent for a plurality of times, the polymer cover creeps, and it is difficult to completely restore the polymer cover to an original state. In addition, the polymer material is prone to aging and fatigue, and after the polymer material is bent for a plurality of times, there is a crease and there is a probability that a fatigue fracture occurs.

If glass can have a good bending property, the glass may be a better flexible display cover material. Ultra-thin glass (UTG) is a potential cover material that has a good bending property and that also retains outstanding properties of the glass such as a high modulus, high hardness, high strength, and high transmittance to an extent. Currently, a thickness of the ultra-thin glass may be 0.03 mm to 0.15 mm, a bending limit thereof may reach R2, and there is no obvious creeping phenomenon at a room temperature. There are also some problems in using the UTG as a cover material, and main problems are that reliability decreases as the thickness of the UTG decreases, a brittle fracture easily occurs in a collision process, and a crack easily occurs after a scratch occurs. Therefore, a surface of the UTG needs to be protected, to improve a scratch resistance capability, an impact resistance capability, and a cracking resistance capability thereof.

SUMMARY

This application provides a flexible display cover including ultra-thin glass, a flexible display module, and a flexible display apparatus, to resolve or remedy a problem that a flexible display cover including a polymer film is prone to arching, crease, fatigue fracture, a Newton's ring, or the like in a use process, and increase a scratch resistance capability, an impact resistance capability, and a cracking resistance capability of the flexible display cover.

According to a first aspect, this application provides a flexible display cover. The flexible display cover is configured to cover a flexible display of a flexible display module. The flexible display module is applied to a flexible display apparatus and is bendable. The flexible display cover includes a structure in which at least two layers are superposed, and the two layers are a glass layer and a hardened layer. The glass layer is connected to the flexible display by using an optically clear adhesive (OCA), an optically clear resin (OCR), or the like, and the hardened layer is located on a side that is of the glass layer and that is away from the flexible display, in other words, is located on an outside of the glass layer. The hardened layer has better hardness and strength, and therefore, can protect the glass layer, to reduce a case in which the flexible display cover is scratched and cracked or is cracked on impact, or a case in which the flexible display cover is cracked and then a glass fragment is splashed, and facilitate improvement in user experience. The glass layer has good linear elasticity, and plastic deformation hardly occurs before a brittle fracture occurs. Therefore, the flexible display cover can still be restored to an initial state even after the flexible display cover is statically bent for a period of time at a high temperature. In addition, the glass layer has a high modulus (a modulus of toughened glass may exceed 70 GPa) and high hardness, to stabilize a polymer layer in the display module, reduce occurrence of arching, improve flatness, and improve an overall display effect.

During specific disposing of the glass layer, a thickness $M_1$ of the glass layer may satisfy a formula: $50\,\mu m \leq M_1 \leq 150\,\mu m$, and the glass layer may include any one of soda-lime glass, aluminosilicate glass, sodium aluminosilicate glass, lithium aluminosilicate glass, phosphorus aluminosilicate glass, or glass-ceramic glass. Usually, to ensure a good bending property of glass (for example, the glass has no fracture when a bending radius is R3), chemical strengthening processing needs to be performed on a glass surface. A compressive stress layer can be formed on the glass surface within a range of a thickness between 10 μm and 20 μm through chemical strengthening processing, to ensure that when the glass is bent at a large angle, surface microcrack propagation does not occur on an extruded surface due to a too high tensile stress. A dropping resistance capability and an impact resistance capability of the glass layer and the entire cover are also improved because of existence of the compressive stress layer on the surface, to effectively protect a structure such as an inside flexible display.

During specific disposing of the hardened layer, a thickness $M_2$ of the hardened layer may satisfy a formula: 5 μm≤$M_2$≤50 μm, and a material includes one or a combination of at least two of a UV resin, a polyurethane resin, an acrylic resin, an epoxy resin, an amino resin, an alkyd resin, an organic silicone resin, a siloxane, silicon dioxide, aluminum oxide, zirconia, graphene, or diamond. First, the hardened layer needs to have a good bending property and transmittance, so that after ultra-thin glass covers the hardened layer, the bending property and an optical property of the ultra-thin glass do not deteriorate obviously. Second, good adhesiveness needs to exist between the hardened layer and the glass, to ensure that the hardened layer and the glass are not to be separated in a bending process. A silicon-based material may be preferentially used as the hardened layer or a transition layer between the glass and the hardened layer, to better ensure that the adhesiveness exceeds 3B in a 100-grid test. Further, the hardened layer needs to protect the glass, especially the glass surface: pencil hardness of the hardened layer needs to exceed 2H, and an impact resistance property of the glass after the glass covers the hardened layer also needs to be improved.

In addition, a flexible protective layer is provided on a periphery of the glass layer. A height of the flexible protective layer (in a direction perpendicular to a glass panel) is close to the thickness of the glass layer, and a thickness $M_3$ of the flexible protective layer (a distance at which the flexible protective layer vertically extends outwards from a glass edge) may satisfy a formula: 10 μm≤$M_3$≤200 μm. The flexible protective layer may be used to reduce a risk of crack propagation and even cracking of the entire glass layer that are caused by stress concentration on a side edge of the glass layer, and increase a passed yield in a process of assembling the flexible display cover and a service life of an entire machine. A material of the flexible protective layer includes one or a combination of at least two of silica gel, a polyurethane elastomer, a thermoplastic elastomer, a thermoplastic polyester elastomer, a thermoplastic dynamic vulcanizate, and an ethylene propylene diene monomer.

In another technical solution, the flexible display cover may further include an anti-shatter layer, and the anti-shatter layer is disposed on a side that is of the glass layer and that is away from the hardened layer. The anti-shatter layer has an anti-shatter property and an impact resistance property. Even if the glass layer cracks, a glass fragment is not splashed, to improve reliability and safety of the flexible display cover.

During specific disposing of the anti-shatter layer, the anti-shatter layer may be reliably fixed under the glass layer by using an adhesive layer. During specific disposing of the adhesive layer, a material of the adhesive layer may be selected based on a requirement, to specifically ensure that the adhesive layer has better adhesiveness, flexibility, and transmittance. Specifically, the adhesive layer may be an optically clear adhesive layer or may be a photosensitive adhesive layer. A thickness $M_4$ of the adhesive layer may satisfy a formula: 5 μm≤$M_4$≤100 μm. The adhesive layer with this thickness has enough stickiness and may be used to reduce impact on the flexible display module.

In a specific technical solution, a transparent polymer flexible layer or a shear thickening material layer may be selected as a material of the anti-shatter layer, and anti-shatter layers of the two materials have a better anti-shatter effect. When the transparent polymer flexible layer is specifically selected as the anti-shatter layer, a thickness $M_5$ of the transparent polymer flexible layer may satisfy a formula: 5 μm≤$M_5$≤100 μm. The transparent polymer flexible layer with this thickness has a better anti-shatter effect, and has better flexibility. When the transparent polymer flexible layer is specifically selected as the anti-shatter layer, the material may include one or a copolymer or a combination of at least two of a polyimide, polyethylene terephthalate, polyethylene naphthalate, a polycarbonate, or polymethyl methacrylate (PMMA). A user considers an entire display module and a design of the entire machine, and selects the thickness and the material of the transparent polymer flexible layer based on a requirement, so that the anti-shatter layer has a better anti-shatter effect.

In the technical solution including an anti-shatter layer, the anti-shatter layer may be a transparent polymer flexible layer, or may be a shear thickening material layer. A thickness $M_6$ of the shear thickening material layer satisfies a formula: 50 μm≤$M_6$≤200 μm. The shear thickening material layer with this thickness may have an enough anti-shatter effect, and have good flexibility and transmittance. During specific disposing of the anti-shatter layer, a material of the shear thickening material layer may include an elastomer composite material whose matrix is a hydroxy-terminated polydimethylsiloxane, polyurethane, and a styrene block polymer, or a shear thickening fluid fiber composite material.

According to a second aspect, this application provides a flexible display module. The flexible display module includes at least a flexible display and the flexible display cover in any one of the foregoing technical solutions, and the flexible display cover is superposed with the flexible display. A cover of a flexible display apparatus includes a glass layer and a hardened layer that are superposed. The hardened layer has high hardness and strength, and therefore, can protect the glass layer, to reduce a case in which the flexible display cover is scratched or is easily cracked under pressure, and facilitate improvement in user experience. The glass layer has good linear elasticity, and plastic deformation hardly occurs before a brittle fracture occurs. Therefore, the flexible display cover can still be restored to an initial state even after the flexible display cover is statically bent for a period of time at a high temperature. The glass layer has a high modulus (a modulus of toughened glass may exceed 70 GPa) and high hardness, and provides good protection for a display panel, to stabilize a polymer layer in the display module, reduce occurrence of arching, improve flatness, and improve an overall display effect.

According to a third aspect, this application provides a flexible display apparatus. The flexible display apparatus includes a housing and a flexible display module installed inside the housing. The flexible display module is the flexible display module in the foregoing technical solutions, and a flexible display cover of the flexible display apparatus includes a glass layer and a hardened layer that are superposed. The hardened layer has high hardness and strength, and therefore, can protect the glass layer, to reduce a case in which the flexible display cover is scratched or is easily cracked under pressure, and facilitate improvement in user experience. The glass layer has good linear elasticity, and plastic deformation hardly occurs before a brittle fracture occurs. Therefore, the flexible display cover can still be restored to an initial state even after the flexible display cover is statically bent for a period of time at a high temperature. The glass layer has a high modulus (a modulus of toughened glass may exceed 70 GPa) and high hardness, and provides good protection for a display panel. The glass layer has high flatness, resists arching, and resists a crease, to improve an appearance texture of the flexible display module.

Figure 1:
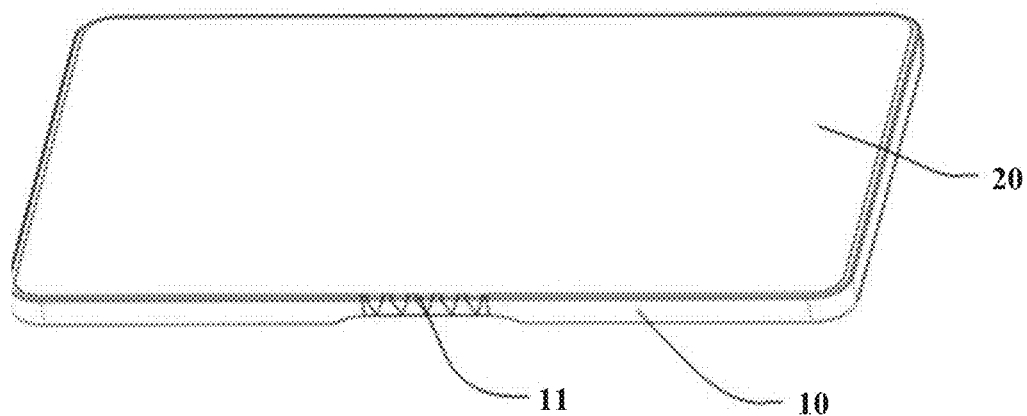
FIG. 1 is a schematic diagram of a structure of a flexible display apparatus in an unfolded state according to an embodiment of this application.

| Reference numerals: |
| --- |
| 10: Housing; |
| 11: Folding part; |
| 20: Flexible display module; |
| 21: Flexible display; |
| 211: Rigid display part; |
| 212: Flexible display part; |
| 22: Flexible display cover; |
| 221: Glass layer; |
| 222: Hardened layer; |
| 223: Flexible protective layer; |

| -continued |
| --- |
| Reference numerals: |
| 224: Anti-shatter layer; |
| 2241: Matrix; |
| 2242: Dispersed particle; and |
| 225: Adhesive layer. |

DESCRIPTION OF EMBODIMENTS

To make objectives, technical solutions, and advantages of this application clearer, the following further describes this application in detail with reference to accompanying drawings.

Terms used in the following embodiments of this application are merely intended to describe specific embodiments, but are not intended to limit this application. Terms "one", "a" and "this" of singular forms used in this specification and the appended claims of this application are also intended to include expressions such as "one or more", unless otherwise specified in the context clearly.

Reference to "one embodiment" or "some embodiments" described in this specification or the like means that one or more embodiments of this application include a particular feature, structure, or characteristic described in combination with the embodiment. Thus, phrases "in one embodiment", "in some embodiments", "in some other embodiments", "in some additional embodiments", and the like that appear in different parts in this specification do not necessarily mean referring to a same embodiment, but mean "one or more embodiments, but not all embodiments", unless otherwise specifically emphasized. Terms "include", "comprise", "have", and their variants all mean "include but are not limited to", unless otherwise specifically emphasized.

Figure 2:
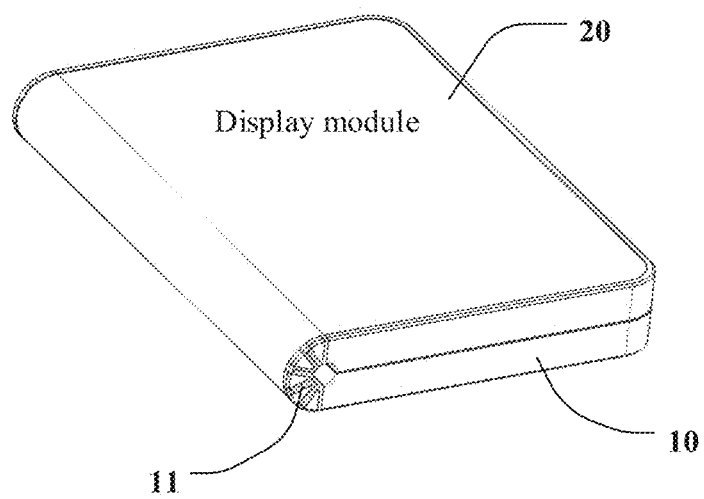
FIG. 2 is a schematic diagram of a structure of a flexible display apparatus in a folded state according to an embodiment of this application.
Figure 3:
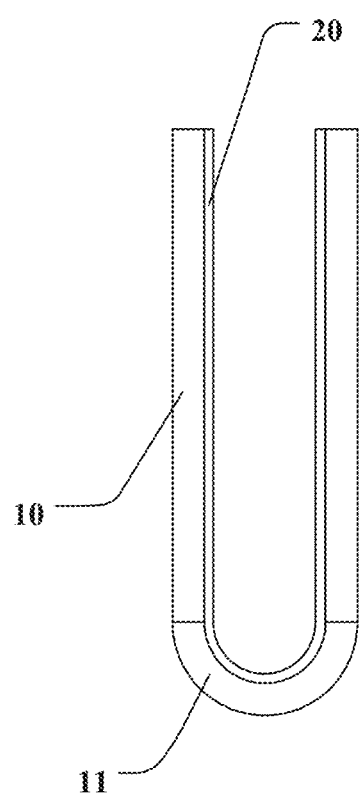
FIG. 3 is a schematic diagram of another structure of a flexible display apparatus according to an embodiment of this application.

A flexible display cover provided in an embodiment of this application may be applied to a foldable flexible display apparatus, for example, a common foldable mobile terminal such as a mobile phone or a tablet computer. For example, FIG. 1 shows a shape when a flexible display apparatus is unfolded. FIG. 2 shows a shape when the flexible display apparatus shown in FIG. 1 is folded. The flexible display apparatus includes a housing 10 and a flexible display module 20. The housing 10 has a folding part 11 that can be folded, and the flexible display module 20 may be folded as the folding part 11 is folded. First, as shown in FIG. 1, when the flexible display apparatus is unfolded, the housing 10 of the flexible display apparatus is unfolded, and the flexible display module 20 disposed on the housing 10 is also unfolded. As shown in FIG. 2, when the flexible display apparatus is folded, the housing 10 of the flexible display apparatus is folded, and the flexible display module 20 is also folded. The flexible display module 20 shown in FIG. 2 is located on an exposed side of the housing 10 when the flexible display apparatus is folded. FIG. 3 is a schematic structural diagram of another flexible display apparatus. After the flexible display apparatus provided in this embodiment is folded, the housing 10 is exposed, and the flexible display module 20 is located on an inside of the housing 10. It can be learned from the foregoing description that the flexible display module 20 may be bent when the folding part 11 of the flexible display apparatus is folded, and may be unfolded when the flexible display apparatus is unfolded. It should be understood that merely several specific embodiments are described above, and the flexible display apparatus in this application may include any flexible display apparatus whose flexible display module can be folded, bent, or rolled.

Figure 4:
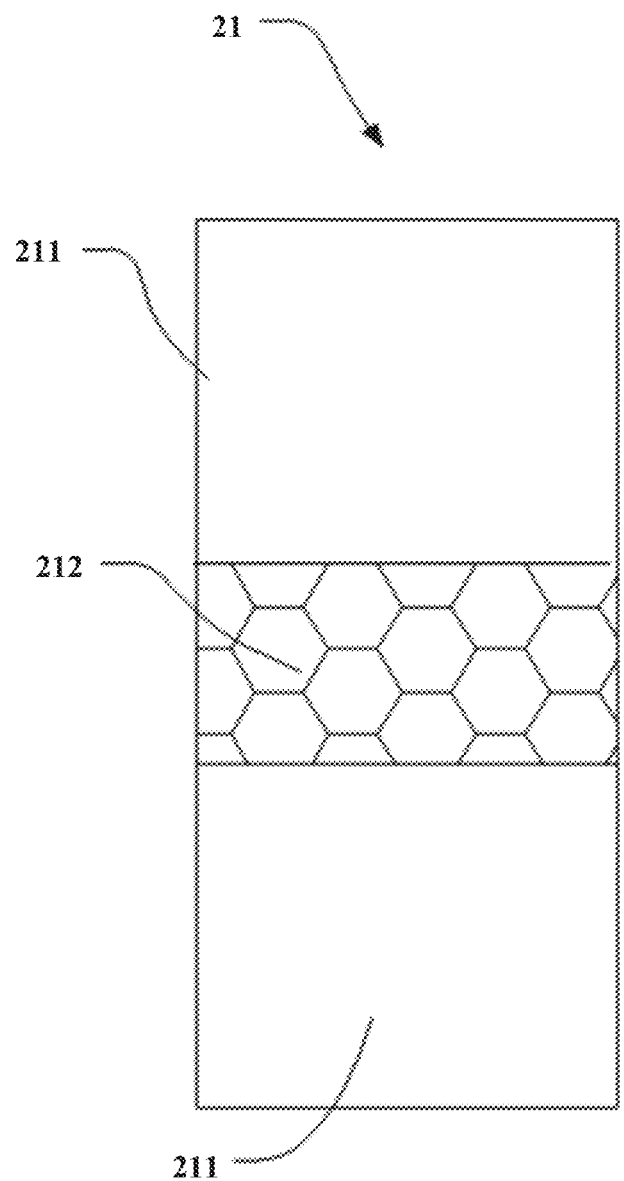
FIG. 4 is a schematic diagram of a structure of a flexible display according to an embodiment of this application.
Figure 5:
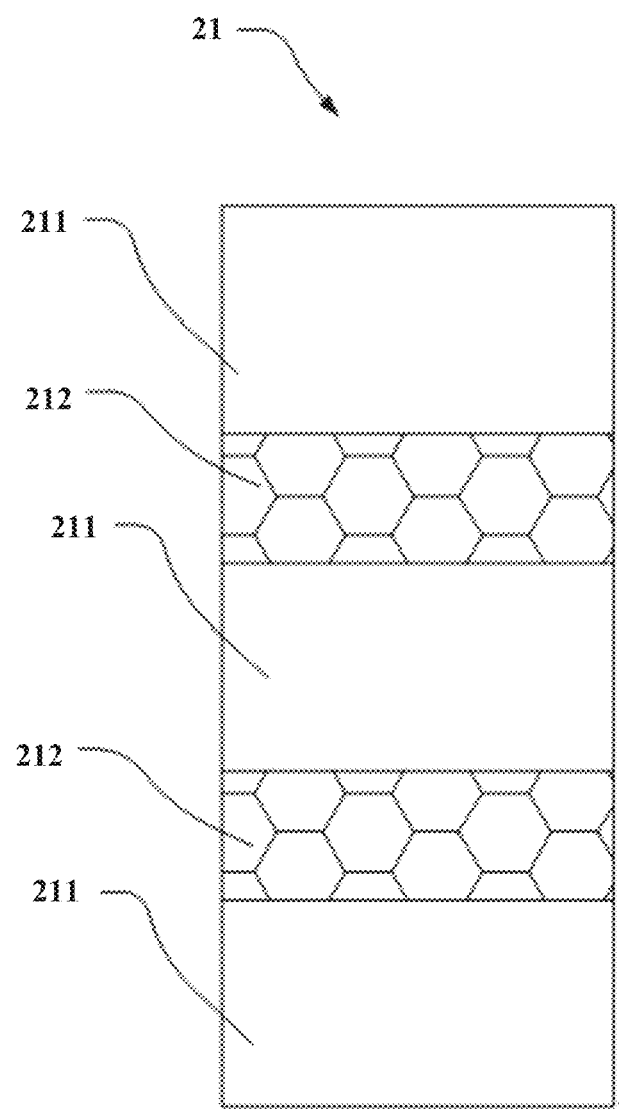
FIG. 5 is a schematic diagram of another structure of a flexible display according to an embodiment of this application.

The flexible display module may include a flexible display, a touch layer, and a flexible display cover. The flexible display may be an integrated flexible display. FIG. 4 is a schematic structural diagram of a flexible display. The flexible display 21 may alternatively be a spliced display including two rigid display parts 211 and one flexible display part 212 located between the two rigid display parts 211. FIG. 5 is a schematic structural diagram of another flexible display. The flexible display 21 may alternatively include at least three rigid display parts 211 and at least two flexible display parts 212, and one flexible display part 212 is spliced between any two adjacent rigid display parts 211. The touch layer may have a flexible foldable structure, and a specific structure and construction of the flexible display module 20 are described in detail below.

Figure 6:
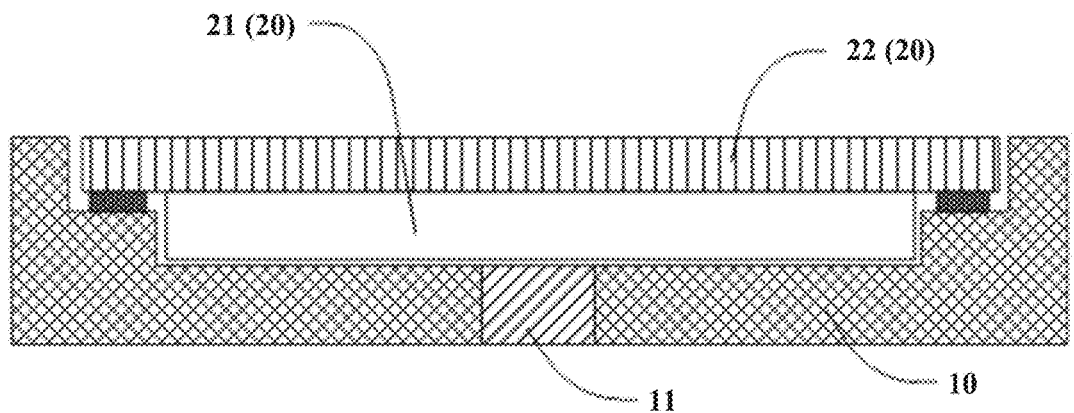
FIG. 6 is a schematic diagram of a cross-sectional structure of a flexible display apparatus according to an embodiment of this application.
Figure 7:
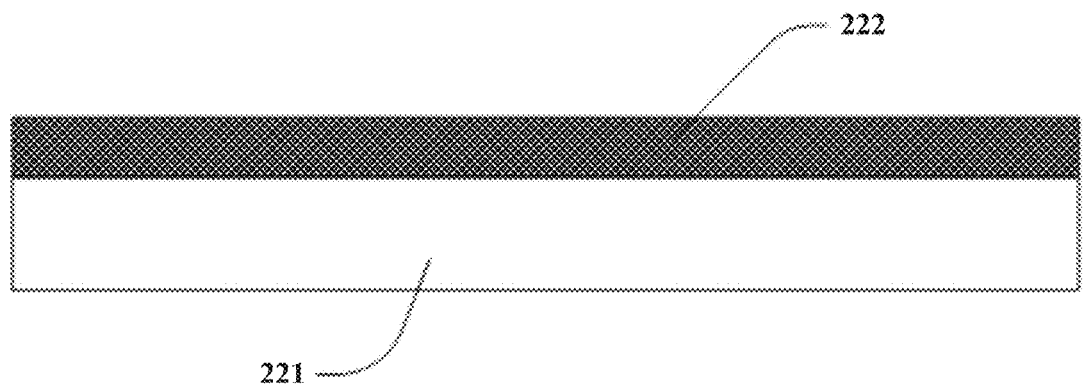
FIG. 7 is a schematic diagram of a cross-sectional structure of a flexible display module according to an embodiment of this application.

FIG. 6 is a schematic diagram of a cross-sectional structure of a flexible display apparatus 20 according to an embodiment of this application. The flexible display module 20 provided in this embodiment of this application may include a flexible display 21 and a flexible display cover 22. The flexible display cover 22 is configured to: cover the flexible display 21, and serve as a protective layer of the flexible display module 20. FIG. 7 is a schematic diagram of another cross-sectional structure of a flexible display module 20 according to an embodiment of this application. The flexible display cover 22 may include a structure with two layers, and the two layers are a glass layer 221 and a hardened layer 222. The glass layer 221 may be an ultra-thin flexible glass layer, and the glass layer 221 is flexible and bendable. The hardened layer 222 and the glass layer 221 are superposed, and the hardened layer 222 is located on a side that is of the glass layer 221 and that is away from the flexible display 21. In other words, the hardened layer 222 is located on an outer surface of the glass layer 221. In other words, the outer surface is a surface that is of the glass layer 221 and that faces a user when the user uses the flexible display module 20. The hardened layer 222 has high hardness and strength, and therefore, can protect the glass layer 221, to reduce a case in which the flexible display cover 22 is scratched or is easily cracked under pressure, and facilitate improvement in user experience. The glass layer 221 has good linear elasticity, and plastic deformation hardly occurs before a brittle fracture occurs. Therefore, the flexible display cover can still be restored to an initial state even after the flexible display cover is statically bent for a period of time at a high temperature. The glass layer 221 has a high modulus (a modulus of toughened glass may exceed 70 GPa) and high hardness, and provides good protection for a display panel. The glass layer has high flatness, resists arching, and resists a crease, to improve an appearance texture of the flexible display module.

Specifically, the glass layer 221 needs to have a thickness which makes the glass layer be flexible enough and have enough strength. Usually, a smaller thickness of the glass layer results in higher flexibility of the flexible display cover 22 and a better bending effect; and a greater thickness of the glass layer results in higher strength of the glass layer and greater difficulty in cracking and damaging the glass layer. In this embodiment of this application, based on a large amount of data analysis and simulated calculation experience, it is considered that the thickness $M_1$ of the glass layer may satisfy a formula: 50 µm≤$M_1$≤150 µm. During specific setting of the thickness of the glass layer, a thickness such as 53 µm, 55 µm, 58 µm, 60 µm, 65 µm, 70 µm, 75 µm, 80 µm, 85 µm, 90 µm, 95 µm, 100 µm, 105 µm, 110 µm, 115 µm, 120 µm, 125 µm, 130 µm, 135 µm, 140 µm, or 145 µm may be used, to achieve flexibility and enough strength of the flexible display cover 22.

During specific disposing of the glass layer 221, prestress strengthening needs to be performed on glass, to ensure that the glass is not cracked in a bending process. A chemical strengthening method may be selected, and glass on which stress strengthening is easily performed, for example, aluminum-silicon-based glass (including aluminosilicate glass, sodium aluminosilicate glass, lithium aluminosilicate glass, phosphorus aluminosilicate glass, or the like), is usually selected. For example, $Na_2O$—$Al_2O_3$—$SiO_2$-based glass may be put into molten potassium nitrate, and in a temperature range lower than a glass transition point, a potassium ion (K+) with a larger ionic radius/volume in molten salt replaces a sodium ion (Na+) with a smaller ionic radius/volume at a glass surface layer, and a pressure layer is formed on a glass surface. A compressive stress layer formed on the glass surface layer can suppress surface microcrack propagation to some extent, to ensure that the glass is not cracked in the bending process, improve strength of the glass, and protect the flexible display. The glass may alternatively be soda-lime glass or glass-ceramic glass. Specifically, a proportion of a chemical component in the glass may be selected based on a requirement.

During specific manufacturing of the hardened layer 222, the hardened layer 222 may be directly manufactured on a surface of the glass layer 221 by using a process of roll coating, spread coating, spray coating, flow coating, dipping coating, deposition, sputter coating, or ion plating. The hardened layer 222 may be an organic material or an inorganic material, and may specifically be one or a combination of at least two of a UV resin, a polyurethane resin, an acrylic resin, an epoxy resin, an amino resin, an alkyd resin, an organic silicone resin, a siloxane, silicon dioxide, aluminum oxide, zirconia, graphene, or diamond. An organic material selected for manufacturing the hardened layer usually can be directly coated on a glass substrate by using a low temperature process such as roll coating, spread coating, spray coating, flow coating, or dipping coating, and cured through air drying, thermal curing, UV (ultraviolet) curing, or the like. An inorganic material selected for manufacturing the hardened layer, for example, zirconia and aluminum oxide, usually needs to form a film on the glass surface through vacuum evaporation, sputter coating, ion plating, or the like, or is used as a filler or pigment, mixed with the organic paint, and then coated on the glass surface by using a process such as roll coating, spread coating, spray coating, flow coating, or dipping coating. In this embodiment, the hardened layer 222 may be a single material or a composite material. Specifically, the hardened layer 222 may be generated by combining an epoxy resin and aluminum oxide, and a combination process is not limited. For example, when a solution of the hardened layer is prepared, the two materials are added in proportion, to form a hardened layer including the two materials. The material of the hardened layer 222 has high hardness, high flexibility, and high transmittance. During specific manufacturing of the hardened layer 222, a thickness $M_2$ of the hardened layer 222 may satisfy a formula: 5 µm≤$M_2$≤50 µm. In a specific embodiment, the thickness of the hardened layer may be 8 µm, 10 µm, 12 µm, 15 µm, 18 µm, 20 µm, 23 µm, 25 µm, 29 µm, 30 µm, 31 µm, 34 µm, 35 µm, 38 µm, 40 µm, 42 µm, 45 µm, or 47 µm. The hardened layer 222 is flexible enough when providing enough protection for the glass layer 221. During manufacturing of the hardened layer 222, a manufacturing process, a material, and a thickness of the hardened layer 222 may be designed and selected based on a requirement, and hardness of the hardened layer 222 may be at least pencil hardness of 2H by using a proper design. When the hardness of the hardened layer 222 reaches the foregoing degree, the flexible glass layer 221 can be better protected.

Figure 8:
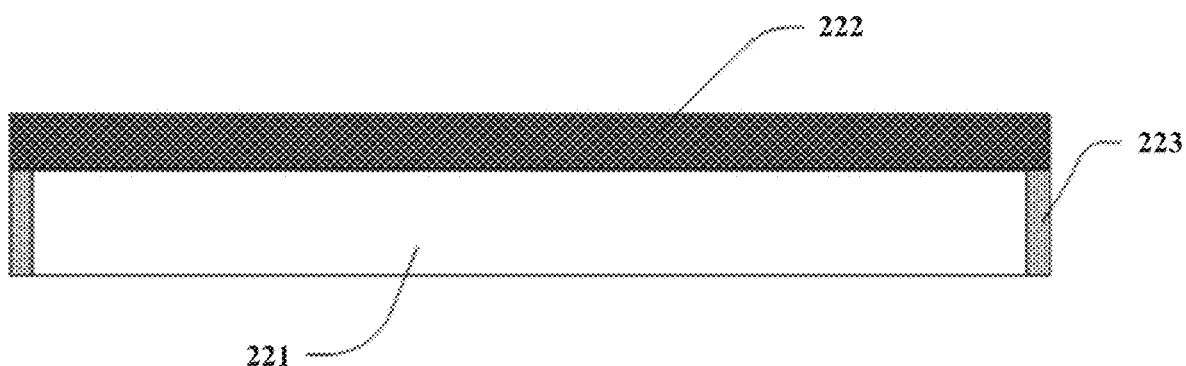
FIG. 8 is a schematic diagram of another cross-sectional structure of a flexible display module according to an embodiment of this application.
Figure 9:
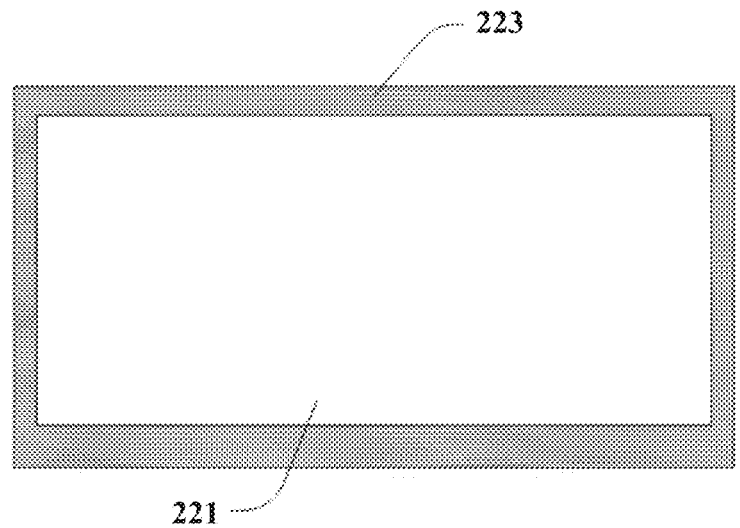
FIG. 9 is a schematic top view of a structure of a flexible display module according to an embodiment of this application.

In the technical solution of this application, the glass layer 221 is flexible. Therefore, the glass layer 221 has a small thickness, and is relatively fragile. In particular, an edge area is prone to damage, and the glass layer 221 may be cracked even due to a several-micrometer defect. To resolve this problem, refer to FIG. 8 and FIG. 9. FIG. 8 is a schematic diagram of another cross-sectional structure of a flexible display module according to an embodiment of this application. FIG. 9 is a top-view schematic structural diagram of a flexible display module according to an embodiment of this application. In the embodiment shown in FIG. 8, a flexible protective layer 223 is further provided on a peripheral side of the glass layer 221. The flexible protective layer 223 may completely cover a periphery of the glass layer 221, or may cover, based on an actual product structure, only an area that is of the glass layer 221 and that is prone to crack. Therefore, when the peripheral side of the glass layer 221 is subject to pressure or any stimulation, the flexible protective layer 223 may absorb the pressure to protect the glass layer 221, to reduce a case in which the entire glass layer 221 is cracked due to stress on a side edge of the glass layer 221, and increase a service life of the flexible display cover 22.

During specific disposing of the flexible protective layer 223, a material of the flexible protective layer 223 may be any one or a combination of at least two of silica gel, a polyurethane elastomer (PU), a thermoplastic elastomer (TPE), a thermoplastic polyester elastomer (TPEE), a thermoplastic dynamic vulcanizate (TPV), and an ethylene propylene diene monomer (EPDM). During manufacturing of the flexible protective layer 223, the flexible protective layer 223 may be a single material, or may be a composite material generated by combining at least two materials. Specifically, a silica gel material and a thermoplastic polyester elastomer material may be combined, and a combination process is not limited. For example, when a solution of the flexible protective layer is prepared, the two materials may be added in proportion. The flexible protective layer 223 may be selected based on a requirement. The flexible protective layer 223 has elasticity, so that when subject to external pressure, the flexible protective layer 223 can absorb the pressure and relieve the stress on the glass layer 221.

During specific setting of the thickness of the flexible protective layer 223, it needs to be considered to provide enough protection for an edge of the glass layer 221, and a dimensional tolerance of the edge of the glass layer 221 needs to be considered. A dimensional tolerance of an edge of ultra-thin glass is usually between 10 micrometers and 100 micrometers, and therefore, the thickness $M_3$ of the flexible protective layer 223 may satisfy a formula: 10 μm≤$M_3$≤200 μm. The flexible protective layer 223 with this thickness may have a better protection effect. Specifically, a flexible protective layer with a greater thickness and higher flexibility better protects the glass layer 221. However, because parameters such as refractive indexes of the protective layer 223 and the glass layer 221 are different, a too greater thickness of the flexible protective layer 223 may affect a display effect of a screen edge. In a specific embodiment, the thickness of the flexible protective layer 223 may be 20 μm, 30 μm, 50 μm, 80 μm, 100 μm, 120 μm, 130 μm, 150 μm, 170 μm, or 180 μm. During manufacturing of the flexible protective layer 223, a value of the dimensional tolerance of the edge of the glass layer 221 also needs to be considered. When the dimensional tolerance of the edge of the glass layer 221 is a little large, a material with better flexibility should be used for filling, to reduce extrusion pressure exerted by the flexible layer when a maximum value is used as a dimension of the edge of the glass layer 221.

Figure 10:
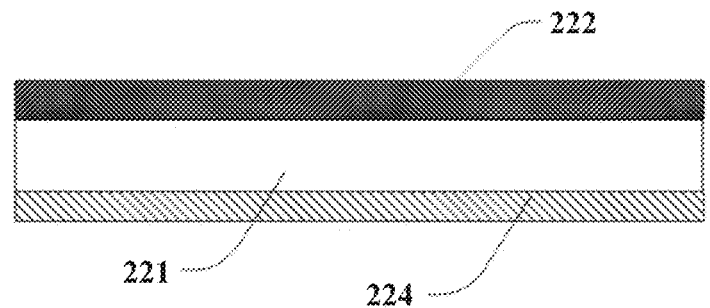
FIG. 10 is a schematic diagram of another cross-sectional structure of a flexible display module according to an embodiment of this application.
Figure 11:
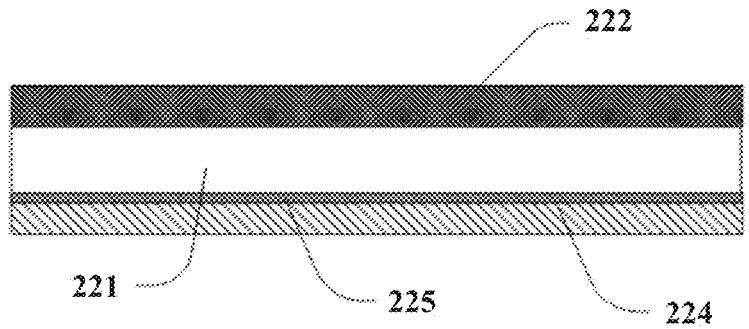
FIG. 11 is a schematic diagram of another cross-sectional structure of a flexible display module according to an embodiment of this application.

FIG. 10 is a schematic diagram of another cross-sectional structure of a flexible display module according to an embodiment of this application. In this embodiment, an anti-shatter layer 224 is further disposed on an inside of the glass layer 221. In other words, the anti-shatter layer 224 is located on a side that is of the glass layer 221 and that is close to the flexible display 21. In other words, the glass layer 221 is located between the hardened layer 222 and the anti-shatter layer 224. The anti-shatter layer 224 has an anti-shatter property, so that even if the glass layer 221 is cracked, splashing does not occur, thereby improving reliability and safety of the flexible display cover 22. In addition, an impact resistance property of the flexible display cover 22 may be further improved. FIG. 11 is a schematic diagram of another cross-sectional structure of a flexible display module according to an embodiment of this application. In a specific embodiment, the anti-shatter layer 224 may be bond and fixed to the glass layer 221 by using an adhesive layer 225, so that the anti-shatter layer 224 is reliably fixed to a lower side of the glass layer 221. Specifically, the adhesive layer 225 may be an optically clear adhesive layer or may be a photosensitive adhesive layer. The adhesive layer 225 may have good adhesiveness, to improve reliability of bonding the anti-shatter layer 224 and the glass layer 221 and reliability of working of the anti-shatter layer 224. The adhesive layer 225 may further have enough flexibility, to be bent along with the flexible display module 20. In addition, the adhesive layer 225 may further have good transmittance, to reduce impact on a display effect of the flexible display module 20.

During specific manufacturing of the adhesive layer, the adhesive layer needs to have a thickness, so that the adhesive layer 225 has enough stickiness. In addition, the adhesive layer 225 needs to be as thin as possible, to reduce the impact on the flexible display module. Specifically, a thickness $M_4$ of the adhesive layer may satisfy a formula: 5 μm≤$M_4$≤100 μm. Specifically, the thickness of the adhesive layer 225 may be 10 μm, 15 μm, 20 μm, 25 μm, 30 μm, 35 μm, 40 μm, 45 μm, 50 μm, 55 μm, 60 μm, 65 μm, 70 μm, 75 μm, 80 μm, 85 μm, 90 μm, 95 μm, or the like. Specifically, the adhesive layer 225 may be implemented by selecting a proper type of adhesive material and a thickness based on a material characteristic of the adhesive layer 225 and a requirement for adhesive strength of the anti-shatter layer 224 and the glass layer 221.

During specific disposing of the anti-shatter layer 224, the anti-shatter layer 224 may be a transparent polymer flexible layer, and the transparent polymer flexible layer specifically has an anti-shatter property. A material of the transparent polymer flexible layer may be any one of a polyimide (PI), polyethylene terephthalate (PET), polyethylene naphthalate (PEN), a polycarbonate (PC), a copolymer of cycloolefin (COC), or polymethyl methacrylate (PMMA), or a combination of at least two of the foregoing materials. The user selects and designs a specific material of the anti-shatter layer 224 based on a requirement, so that the anti-shatter layer 224 has an enough anti-shatter effect. When the anti-shatter layer 224 is specifically disposed as a transparent polymer flexible layer, a thickness $M_5$ of the transparent polymer flexible layer may satisfy a formula: 5 µm≤$M_5$≤100 µm. The thickness may be specifically 10 µm, 15 µm, 20 µm, 25 µm, 30 µm, 35 µm, 40 µm, 45 µm, 50 µm, 55 µm, 60 µm, 65 µm, 70 µm, 75 µm, 80 µm, 85 µm, 90 µm, 95 µm, or the like. The anti-shatter layer 224 with this thickness has a good anti-shatter effect, and has good flexibility. The user may select a proper thickness of the anti-shatter layer 224 based on an anti-shatter requirement of the flexible display cover 22 and the material of the anti-shatter layer 224.

Figure 12:
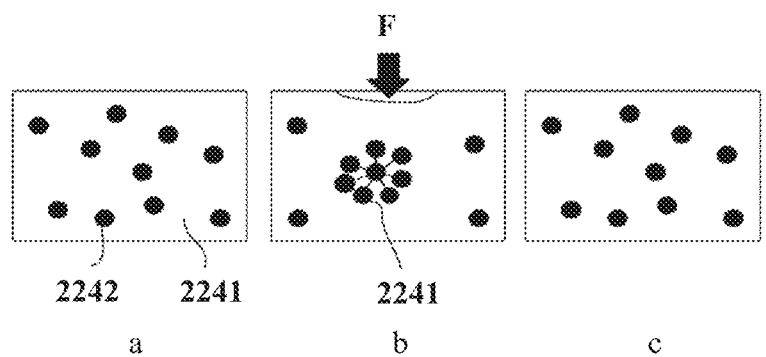
FIG. 12 is a schematic diagram of a microstructure of a material with a shear thickening effect according to an embodiment of this application.

During specific disposing of the anti-shatter layer 224, the anti-shatter layer 224 may be a shear thickening material layer. A shear thickening material is usually a non-Newtonian fluid, viscosity of the shear thickening material increases as a shear rate increases, and apparent viscosity increases sharply under high-speed impact. The material may be used as a good protective material. However, the fluid is in a liquid state, and has a short service life, and defects such as a weak anti-aging property and an anti-secondary damage property limit a large-scale application of the fluid. However, a material that has the shear thickening effect and that is obtained by using a polymer as a matrix and adding a dispersed particle to the matrix gradually becomes a development direction. Therefore, the material with the shear thickening effect is also referred to as a shear thickening material. FIG. 12 is a schematic diagram of a microstructure of a material with a shear thickening effect according to an embodiment of this application. FIG. 12 shows a material with a shear thickening effect. Dispersed particles 2242 are added to a matrix 2241 of the material. The material with a shear thickening effect is in a viscous flow state in quasi-static loading. The dispersed particles 2242 added to the matrix 2241 are in a uniformly dispersed state (as shown in a part in FIG. 12), and the dispersed particles 2242 absorb energy under an action of an impact load F, and are in an aggregated state (as shown in a part b in FIG. 12). The material with a shear thickening effect is in a solid state. Therefore, when being subject to the impact load F, the material exhibits an impact resistance property, and the impact resistance property is enhanced with an increase in an impact velocity. However, when the impact load F disappears, the dispersed particles 2242 in the matrix 2241 are restored to the uniformly dispersed state (as shown in a part c in FIG. 12), to represent elasticity and implement flexibility and bendability. Therefore, the thickening material layer is used as the anti-shatter layer 224, so that the anti-shatter layer 224 can have a good anti-shatter property and an impact resistance property.

In a specific embodiment, the material of the shear thickening material layer may be an elastomer composite material whose matrix is a hydroxy-terminated polydimethylsiloxane (PDMS), polyurethane (PU), and a styrene block polymer. A material with a better shear thickening effect is obtained by adding a dispersed particle to the matrix. Alternatively, the material of the shear thickening material layer may be a shear thickening fluid fiber composite material. The user can select a proper material as a shear thickening material layer based on a requirement. During specific disposing of the shear thickening material layer, a thickness $M_6$ of the shear thickening material layer may satisfy a formula: 50 µm≤$M_6$≤200 µm. The thickness thereof may be specifically 55 µm, 60 µm, 65 µm, 70 µm, 75 µm, 80 µm, 85 µm, 90 µm, 95 µm, 100 µm, 105 µm, 110 µm, 115 µm, 120 µm, 125 µm, 130 µm, 135 µm, 140 µm, or 145 µm. The shear thickening material layer with this thickness may have an enough anti-shatter effect, and have good flexibility and transmittance. The user may select a proper thickness of the anti-shatter layer 224 based on an anti-shatter requirement for the flexible display cover 22 and the material of the shear thickening material layer.

Figure 13:
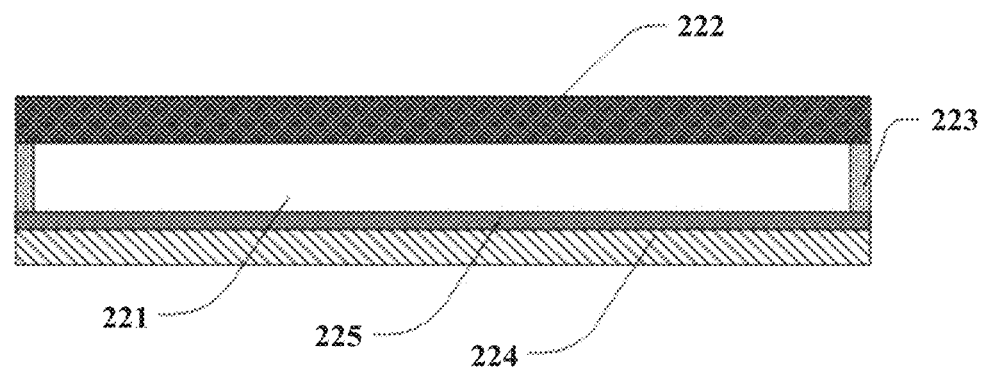
FIG. 13 is a schematic diagram of another cross-sectional structure of a flexible display module according to an embodiment of this application.

Refer to FIG. 13. An embodiment of this application provides a flexible display cover. Ultra-thin flexible glass with a thickness of 100 µm is used as a glass layer 221 of the flexible display cover, and a hardened layer 222 of 10 µm is coated on an outer surface of the glass layer 221 by using a flow coating process, to avoid scratching in daily use. Surface pencil hardness of the hardened layer 222≥5H. A layer of 20 µm flexible silica gel is coated on an edge of the ultra-thin flexible glass layer 221 by using a roll coating process, and is used as a flexible protective layer 223, to avoid a crack caused by a direct contact between the edge of the flexible glass layer 221 and a hard object such as a structural member. A low-modulus optically clear adhesive (OCA) with a thickness of 50 µm is used as an adhesive layer 225, and an inner surface of the ultra-thin flexible glass layer 221 is bonded to a shear thickening material layer (an anti-shatter layer 224), to prevent glass from being cracked and splashed, and improve an impact resistance property of the surface of the flexible display cover. Therefore, the flexible display cover shown in FIG. 10 has advantages of improving surface hardness and flatness, reducing a probability of cracking a glass edge, preventing the glass from being cracked and splashed, and improving the impact resistance property. It should be understood that this embodiment is merely used as a specific implementation.

Certainly, in the flexible display cover shown in FIG. 13, ultra-thin flexible glass with a thickness of 70 µm may be alternatively used as the glass layer 221 of the flexible display cover, and a hardened layer 222 of 20 µm is coated on an outer surface of the glass layer 221 by using a spray coating process, to avoid scratching in daily use. Surface pencil hardness of the hardened layer 222≥5H. A layer of 20 µm flexible silica gel is coated on an edge of the ultra-thin flexible glass layer 221 by using a roll coating process, and is used as the flexible protective layer 223, to avoid a crack caused by a direct contact between the edge of the flexible glass and a hard object such as a structural member. A low-modulus optically clear adhesive (OCA) with a thickness of 30 µm is used as an adhesive layer 225, and an inside of the ultra-thin flexible glass layer 221 is bonded to a flexible and transparent polyimide (PI) film (the anti-shatter layer 224), to prevent the glass from being cracked and splashed. Therefore, the flexible display cover shown in FIG. 10 has advantages of improving surface hardness and flatness, reducing a probability of cracking a glass edge, preventing the glass from being cracked and splashed, and improving the impact resistance property. It should be understood that this embodiment is also merely used as a specific implementation.

As shown in FIG. 6, an embodiment of this application further provides a foldable display module 20. The flexible display module 20 may include a flexible display 21 and the flexible display cover 22 described in any one of the foregoing embodiments. The flexible display cover 22 is configured to: cover the flexible display 21, and serve as a protective layer of the flexible display module 20. Refer to FIG. 7. The flexible display cover 22 includes a structure with at least two layers, and the two layers are a glass layer 221 and a hardened layer 222. The glass layer 221 may be an ultra-thin flexible glass layer, and the glass layer 221 is flexible and bendable. The hardened layer 222 and the glass layer 221 are superposed, and the hardened layer 222 is located on a side that is of the glass layer 221 and that is away from the flexible display 21. In other words, the hardened layer 222 is located on an outer surface of the glass layer 221. In other words, the outer surface is a surface that is of the glass layer 221 and that faces a user when the user uses the flexible display module 20. The hardened layer 222 has high hardness and strength, and therefore, can protect the glass layer 221, to reduce a case in which the flexible display cover 22 is scratched or is easily cracked under pressure, and facilitate improvement in user experience. The glass layer 221 has good linear elasticity, and plastic deformation hardly occurs before a brittle fracture occurs. Therefore, the flexible display cover can still be restored to an initial state even after the flexible display cover is statically bent for a period of time at a high temperature. The glass layer 221 has a high modulus (a modulus of toughened glass may exceed 70 GPa) and high hardness, and provides good protection for a display panel. The glass layer has high flatness, resists arching, and resists a crease, to improve an appearance texture of the flexible display module.

Still refer to FIG. 1 and FIG. 2. An embodiment of this application further provides a flexible display apparatus. The flexible display apparatus includes a housing 10 and a flexible display module 20. The housing 10 has a folding part 11 that can be folded, and the flexible display module 20 is folded as the folding part 11 is folded. First, as shown in FIG. 1, when the flexible display apparatus is unfolded, the housing 10 of the flexible display apparatus is unfolded, and the flexible display module 20 disposed on the housing 10 is also unfolded. In other words, the flexible display module 20 may be bent when the flexible display apparatus is folded, and is unfolded when the flexible display apparatus is unfolded. The flexible display module 20 includes the flexible display cover 22 described in the foregoing embodiments. The flexible display cover 22 is configured to: cover the flexible display 21, and serve as a protective layer of the flexible display module 20.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A flexible display cover for covering a flexible display, comprising:
   A glass layer and a hardened layer that are superposed, wherein the hardened layer is located on a side of the glass layer away from the flexible display, wherein the glass layer comprises one of soda-lime glass, aluminosilicate glass, sodium aluminosilicate glass, lithium aluminosilicate glass, phosphorus aluminosilicate glass, or glass-ceramic glass, wherein a side of the glass layer away from the hardened layer is superposed with an anti-shatter layer, and wherein an adhesive layer is located between the anti-shatter layer and the glass layer.

2. The flexible display cover according to claim 1, wherein a thickness $M_2$ of the hardened layer satisfies: 5 µm≤$M_2$≤50 µm.

3. The flexible display cover according to claim 1, wherein a material of the hardened layer comprises at least one of UV resin, polyurethane resin, acrylic resin, epoxy resin, amino resin, alkyd resin, organic silicone resin, siloxane, silicon dioxide, aluminum oxide, zirconia, graphene, or diamond.

4. The flexible display cover according to claim 1, wherein hardness of the hardened layer is at least pencil hardness of 2H.

5. The flexible display cover according to claim 1, wherein the anti-shatter layer comprises a transparent polymer flexible layer or a shear thickening material layer.

6. The flexible display cover according to claim 1, wherein the anti-shatter layer is the transparent polymer flexible layer, and wherein a thickness $M_5$ of the transparent polymer flexible layer satisfies: 5 µm≤$M_5$≤100 µm.

7. The flexible display cover according to claim 1, wherein the anti-shatter layer is the transparent polymer flexible layer, and wherein a material of the transparent polymer flexible layer comprises at least one of or a copolymer of at least two of polyimide, polyethylene terephthalate, polyethylene naphthalate, polycarbonate, polymethyl methacrylate, or cycloolefin.

8. The flexible display cover according to claim 1, wherein the anti-shatter layer is the shear thickening material layer, and wherein a thickness $M_6$ of the shear thickening material layer satisfies a formula: 50 µm≤$M_6$≤200 µm.

9. The flexible display cover according to claim 1, wherein the anti-shatter layer is the shear thickening material layer, and a material of the shear thickening material layer comprises: (1) an elastomer composite material with a matrix of hydroxy-terminated polydimethylsiloxane, polyurethane, and styrene block polymer, or (2) a shear thickening fluid fiber composite material.

10. The flexible display cover according to claim 1, wherein a flexible protective layer is provided on a peripheral side of the glass layer.

11. The flexible display cover according to claim 10, wherein a thickness $M_3$ of the flexible protective layer satisfies: 10 µm≤$M_3$≤200 µm.

12. The flexible display cover according to claim 10, wherein a material of the flexible protective layer comprises at least one of silica gel, polyurethane elastomer, thermoplastic elastomer, thermoplastic polyester elastomer, thermoplastic dynamic vulcanizate, or ethylene propylene diene monomer.

13. The flexible display cover according to claim 1, wherein the adhesive layer comprises an optically clear adhesive layer or a photosensitive adhesive layer.

14. The flexible display cover according to claim 1, wherein a thickness $M_4$ of the adhesive layer satisfies: 5 µm≤$M_4$≤100 µm.

15. The flexible display cover according to claim 1, wherein a thickness $M_1$ of the glass layer satisfies: 50 µm≤$M_1$≤150 µm.

16. A flexible display module, comprising:
   a flexible display and a flexible display cover, wherein the flexible display cover is superposed with the flexible display, wherein the flexible display cover covers the flexible display of the flexible display module and comprises a glass layer and a hardened layer that are superposed, and wherein the hardened layer is located on a side of the glass layer away from the flexible display, wherein the glass layer comprises one of soda-lime glass, aluminosilicate glass, sodium aluminosilicate glass, lithium aluminosilicate glass, phosphorus aluminosilicate glass, or glass-ceramic glass, wherein a side of the glass layer away from the hardened layer is superposed with an anti-shatter layer, and wherein an adhesive layer is located between the anti-shatter layer and the glass layer.

17. A flexible display apparatus, comprising:

a housing and a flexible display module disposed on the housing, wherein the flexible display module comprises a flexible display and a flexible display cover, wherein the flexible display cover is superposed with the flexible display, wherein the flexible display cover covers the flexible display of the flexible display module and comprises a glass layer and a hardened layer that are superposed, and wherein the hardened layer is located on a side of the glass layer away from the flexible display, wherein the glass layer comprises one of soda-lime glass, aluminosilicate glass, sodium aluminosilicate glass, lithium aluminosilicate glass, phosphorus aluminosilicate glass, or glass-ceramic glass, wherein a side of the glass layer away from the hardened layer is superposed with an anti-shatter layer, and wherein an adhesive layer is located between the anti-shatter layer and the glass layer.

\* \* \* \* \*